W. F. IRRGANG.
TRUCK.
APPLICATION FILED APR. 30, 1919.

1,339,109.

Patented May 4, 1920.

WITNESS:
B. A. Cleaver.

INVENTOR,
William F. Irrgang,
BY
Harry W. Bowen.
ATTORNEY.

UNITED STATES PATENT OFFICE.

WILLIAM F. IREGANG, OF SPRINGFIELD, MASSACHUSETTS, ASSIGNOR TO THE WARREN & IREGANG COMPANY, OF SPRINGFIELD, MASSACHUSETTS, A CORPORATION OF MASSACHUSETTS.

TRUCK.

1,339,109.   Specification of Letters Patent.   Patented May 4, 1920.

Application filed April 30, 1919. Serial No. 293,836.

*To all whom it may concern:*

Be it known that I, WILLIAM F. IREGANG, a citizen of the United States of America, residing at Springfield, in the county of Hampden and Commonwealth of Massachusetts, have invented certain new and useful Improvements in Trucks, of which the following is a specification.

This invention relates to improvements in trucks that are in common use in manufacturing establishments, either as a trailer for attachment to a motor truck, as an electrically operated truck or for placing articles of different kinds thereon, as, for example, castings, paper stock, etc., and moving it about the room. The object of the present invention is to provide a truck that is very rigidly made and one that can be constructed at small expense. The invention broadly considered comprises in locating parallel and spaced beams preferably of channel iron construction on and near the outer edge of the platform and on the under side of the same, and, in the same space between these beams locating the supporting casters or wheels, those at the forward end of the truck being of the swivel type and those at the rear end of the truck being fixed so that the wheels always rotate in the space between the parallel beams.

The present invention is particularly adapted to be used in connection with elevating trucks by running or pushing the upper platform of the elevating truck under the floor board —1— and in the space between the channel irons in the same manner that an elevating truck is run under the usual skids on which the articles to be transferred are placed. The elevating truck can be run under the present structure and for a distance substantially equal to the whole length of the structure shown herein. The present truck, therefore, serves the double purpose of a trailer and also as a platform or skid device.

Referring to the drawings.

Figure 3:
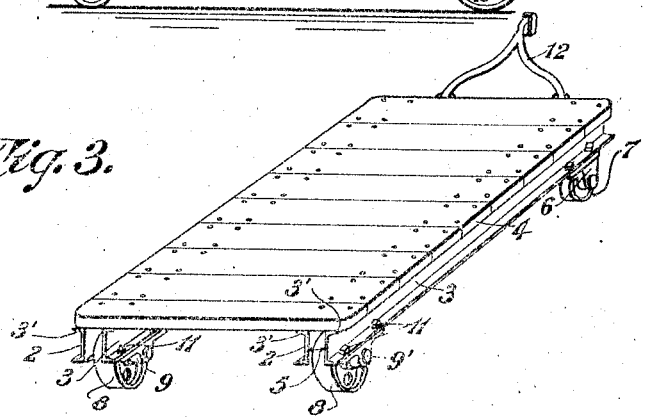
Fig. 3 is a perspective view showing the parallel arranged channel iron beam construction and with the brackets which support the casters secured thereto.

Referring to the drawings in detail; the boards or planks composing the bottom or platform, are indicated at 1. Secured to the under side of the platform are channel irons 2 and 3, the flange portions 3' of the channel being arranged or located slightly back of the edge 4 of the planks. These channel irons are spaced from each other in parallel arrangement as indicated at 5 in Figs. 1 and 3. 6 indicates brackets for supporting the swivel rollers 7 at the forward end of the truck. These brackets, as shown, are bolted to the lower flanges of the channel irons as shown. It will be noticed that by attaching these brackets to the flanges 3' they will be spaced inward from the edge 4 or side of the platform, whereby practically all danger of breakage by striking objects in moving the truck about will be eliminated.

An important feature of the invention is that the load is equally or evenly supported by the two parallel arranged beams 2 and 3, and that the space between the channel irons is in the direct line of the pull or draft of the truck when the same is drawn along the floor. 8 indicates casters for supporting the rear part of the truck which are located midway between the channel irons. These are secured to the channel irons 2 and 3 by means of the bracket 9 which, like the bracket 6, are bolted to both of the channel irons and directly receive the load which is evenly distributed on the two channel irons, and these brackets are spaced inward from the edge 4 of the platform like the brackets 6. Shaft 9' supports the wheels 8. In trucks of this kind it is common to bolt the brackets which carry the rollers on to the side of the beams with the result that an unequal leverage results and often the brackets are broken and twist from the supporting beams or irons.

In the present invention the load is carried and evenly distributed by the shafts at each end of the brackets which in turn are supported by the spaced channel irons.

I am aware that it is broadly old to locate supporting rollers on the under side of trucks and in the space between supporting beams, but I am not aware that supporting rollers are used in this class or type of trucks referred to in my invention and to place the supporting rollers between parallel arranged beams whereby the supporting rollers will be at all times in the line of draft and the load equally supported by each beam.

It will be noticed that in the present invention the line of draft on the truck passes directly through a vertical plane that is located in the space 5 between the beams as indicated by the arrow 10, and that the load is equally distributed on the oppositely located brackets which are secured as stated, to the lower flanges of the channel irons as indicated by the bolts 11.

Figure 1:
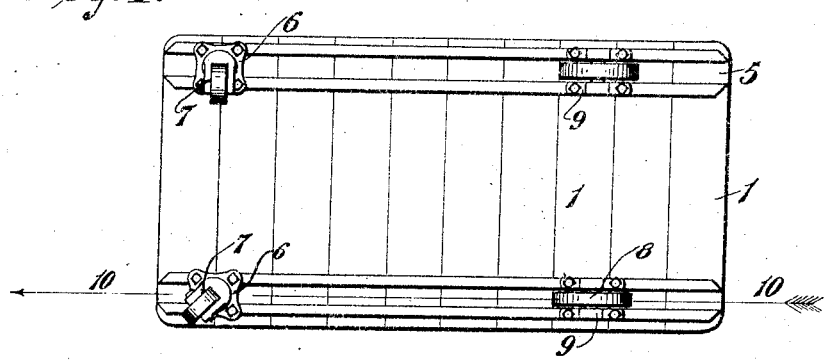
Figure 1 is a bottom plan view of the truck showing the beams and casters secured thereto, the swiveled casters at the forward end of the truck being turned at an angle.
Figure 2:
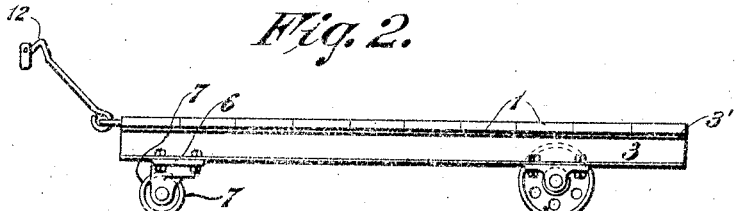
Fig. 2 is a side elevational view showing the truck as used with the casters on the floor.

It will also be noticed that the supporting beams will equally support the load when the swiveled casters 7 are turned as shown in Fig. 1.

A suitable handle is shown at 12.

What I claim is:

In a truck for commercial purposes, the combination with the platform thereof, of two pairs of channel iron supporting beams secured to the under side of the platform and near the outer edges of the same, said beams being spaced in parallel relation to each other and extending the entire length of the platform, supporting rollers located at the ends of the beams and midway in the space between said beams, the forward rollers or casters being of the swivel type and the rear casters or rollers of the fixed type, whereby the load is borne equally by the two pairs of beams and in line with the motion of the truck, and whereby a space between the innermost beams is provided for receiving an elevating truck.

WILLIAM F. IRRGANG.